(12) United States Patent
Durham

(10) Patent No.: US 8,843,733 B2
(45) Date of Patent: *Sep. 23, 2014

(54) SWITCHING BETWEEN MULTIPLE OPERATING SYSTEMS (OSES) USING SLEEP STATE MANAGEMENT AND SEQUESTERED RE-BASEABLE MEMORY

(75) Inventor: David Durham, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/567,421

(22) Filed: Aug. 6, 2012

(65) Prior Publication Data

US 2012/0303947 A1 Nov. 29, 2012

Related U.S. Application Data

(63) Continuation of application No. 12/269,992, filed on Nov. 13, 2008, now Pat. No. 8,239,667.

(51) Int. Cl.
| | |
|---|---|
| G06F 13/00 | (2006.01) |
| G06F 9/00 | (2006.01) |
| G06F 1/32 | (2006.01) |
| G06F 12/02 | (2006.01) |
| G06F 9/44 | (2006.01) |

(52) U.S. Cl.
CPC .......... *G06F 12/0284* (2013.01); *G06F 1/3203* (2013.01); *G06F 9/4418* (2013.01)
USPC ............ 713/100; 711/153; 709/100; 709/319

(58) Field of Classification Search
USPC .............. 711/163, 153, 202, 2; 713/310, 2, 1; 709/319; 718/107; 714/10; 710/260; 726/16, 29
See application file for complete search history.

(56) References Cited

U.S. PATENT DOCUMENTS

| | | | |
|---|---|---|---|
| 6,049,854 A * | 4/2000 | Bedarida ....................... 711/153 |
| 6,678,712 B1 * | 1/2004 | McLaren et al. .............. 718/100 |
| 6,694,401 B2 * | 2/2004 | Nalawadi et al. ................. 711/2 |
| 7,395,421 B1 * | 7/2008 | Nowlin .............................. 713/2 |
| 7,840,793 B2 * | 11/2010 | Wang .................................. 713/2 |
| 2001/0018717 A1 * | 8/2001 | Shimotono ................... 709/319 |
| 2003/0177334 A1 | 9/2003 | King et al. |
| 2004/0181708 A1 * | 9/2004 | Rothman et al. ................. 714/10 |
| 2005/0102459 A1 * | 5/2005 | Zimmer ........................ 710/260 |
| 2005/0108585 A1 * | 5/2005 | Yang .............................. 713/310 |

(Continued)

OTHER PUBLICATIONS

"Mac Virtual Machines and Virtual PC. Automation and Virtualization Software for Desktops" http://www.parallels.com.

(Continued)

Primary Examiner — Thomas Lee
Assistant Examiner — Auriel Prifti
(74) Attorney, Agent, or Firm — Trop, Pruner & Hu, P.C.

(57) ABSTRACT

Embodiments of switching between multiple operating systems (OSes) using sleep state management and sequestered re-baseable memory are generally described herein. Embodiments of the invention allow one OS to be suspended into S3 or sleep mode, saving its state to memory and turning off its devices. Then, another sleeping OS can be resumed from another location in memory by switching a memory base addressed to a sequestered memory region and restoring its device state. Other embodiments may be described and claimed.

17 Claims, 8 Drawing Sheets

(56) References Cited

U.S. PATENT DOCUMENTS

| | | |
|---|---|---|
| 2005/0172294 A1* | 8/2005 | Kanemura et al. ............ 718/107 |
| 2005/0273663 A1 | 12/2005 | Yoon |
| 2007/0044148 A1* | 2/2007 | Goodman et al. .............. 726/16 |
| 2008/0005527 A1* | 1/2008 | Bang ............................. 711/202 |
| 2008/0080491 A1 | 4/2008 | Saripalli |
| 2008/0127355 A1* | 5/2008 | Lorch et al. ..................... 726/29 |
| 2009/0182964 A1* | 7/2009 | Greiner et al. ................ 711/163 |

OTHER PUBLICATIONS

"Apple—Mac OS X Leopard—Features—Boot camp" http://www.apple.com/macosx/features/bootcamp.html.

* cited by examiner

SWITCHING BETWEEN MULTIPLE OPERATING SYSTEMS (OSES) USING SLEEP STATE MANAGEMENT AND SEQUESTERED RE-BASEABLE MEMORY

This application is a continuation of U.S. patent application Ser. No. 12/269,992, filed Nov. 13, 2008 now U.S. Pat. No. 8,239,667, the content of which is hereby incorporated by reference.

BACKGROUND

Client virtualization continues to face serious market acceptance and license related troubles. For example, in one client virtualization product, users have to reboot their systems to switch from one operating system (OS) to another OS. In another example where virtualization technology allows two OSes to run side-by-side, this product is heavily restricted by various end-user license agreements and requires users to upgrade to the most expensive versions of the product to enable virtualization technology.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
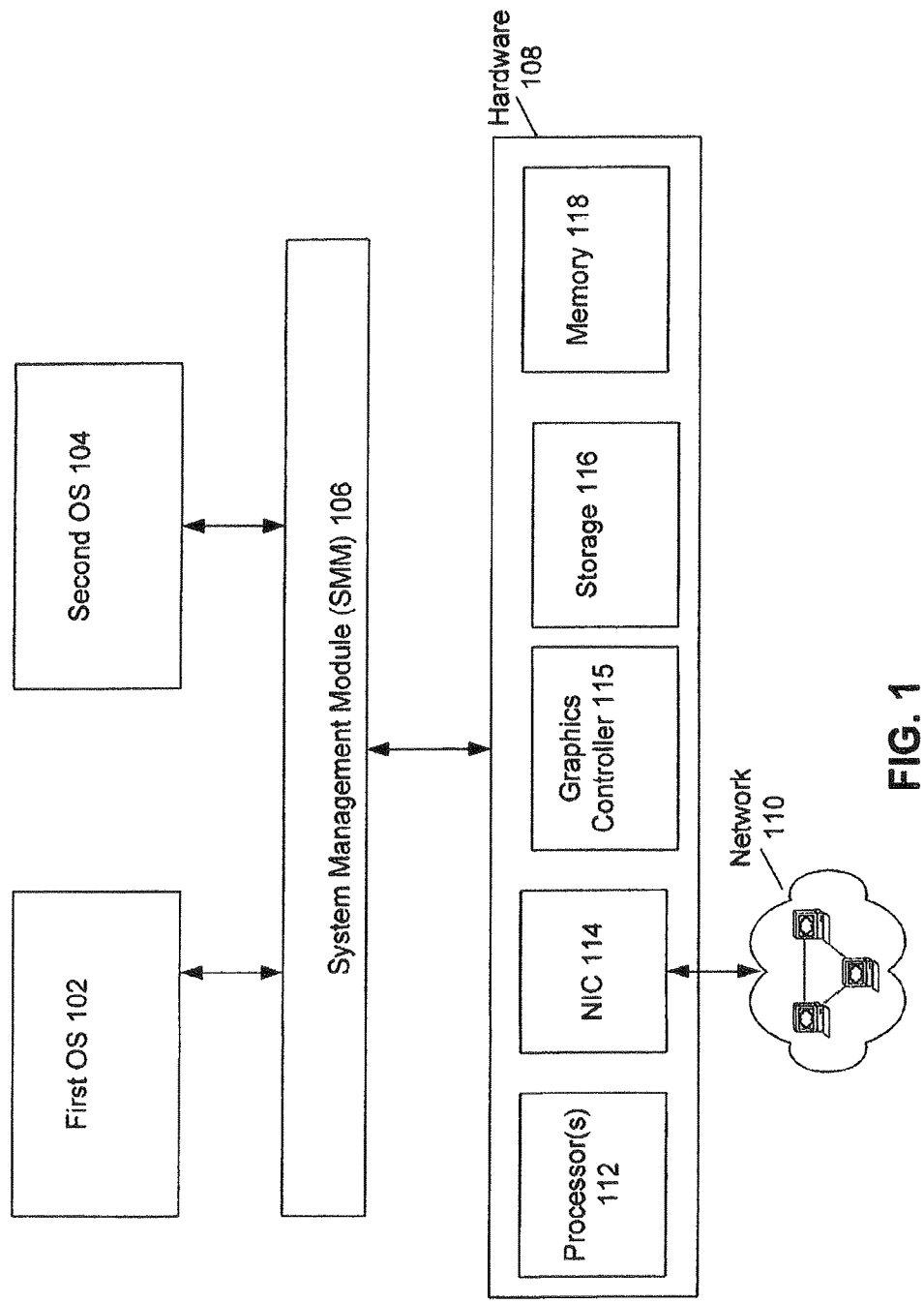
FIG. 1 illustrates a platform for software components within an execution environment, in accordance with an embodiment of the present invention.

Embodiments of the present invention may provide for switching between multiple operating systems (OSes) using sleep state management and sequestered re-baseable memory. The Advanced Configuration and Power Interface (ACPI) specification is an open standard, for unified, operating system-centric device configuration and power management. The ACPI specification defines seven states which an ACPI-compliant computer system can be in, including the S3 (standby or sleep state). In this state, only main memory (RAM) is still powered on. Here, since the state of the operation system and all applications (e.g., open documents, etc.) lie in main memory or RAM, the user can resume work exactly where he or she left off. In other words, the main memory or RAM content when the computer comes back from S3 is the same as when it was put into S3. S3 has advantages over another state defined by the ACPI specification called S4 or hibernation state. With S4, all content of main memory is saved to non-volatile memory such as a hard drive and is powered down. S3 has the advantage over S4 in that the computer resumes in about the time it takes the monitor to come on, and if any running applications have private information in them, then it will not be written to the hard drive or disk.

Embodiments of the invention allow one OS to be suspended into S3, saving its state to memory and turning off its devices. Then, another sleeping OS can be resumed from another location in memory by switching a memory base addressed to a sequestered memory region and restoring its device state. A benefit of embodiments of the invention allows a user to quickly suspend one OS to the sleep mode or state and switch to another OS, picking up where the user left off with the switched OS, and all without having to reboot the system (each OS keeps its full state). This allows multiple OSes to sit side-by-side in physical memory on the same platform. In embodiments, this is done without the use of virtualization software, incurs no additional costs and does not violate end user license agreements, as is discussed above. Other embodiments of the invention are also described herein.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

FIG. 1 illustrates a platform 100 for software components within an execution environment to support embodiments of the invention. Platform 100 may include a first OS environment 102 and a second OS environment 104. Platform 100 may also include a system management module (SMM) 106 that may arbitrate general component access to hardware resources 108 such as one or more processor(s) 112, a network interface controller (NIC) 114, a graphics controller 115, storage 116, and/or memory 118.

In embodiments, processor(s) 112 may execute programming instructions of components of platform 100. Processor(s) 112 may be single and/or multiple-core processor(s), controller(s), application specific integrated circuit(s) (ASIC(s)), etc.

In an embodiment, storage 116 may represent non-volatile storage to store persistent content to be used for the execution of the components on platform 100, such as, but not limited to, operating system(s), program files, configuration files, etc. In various embodiments, storage 116 may include integrated and/or peripheral storage devices, such as, but not limited to, disks and associated drives (e.g., magnetic, optical), universal serial bus (USB) storage devices and associated ports, flash memory, ROM, non-volatile semiconductor devices, etc. In various embodiments, storage 116 may be a storage resource physically part of platform 100 or it may be accessible by, but not necessarily a part of, platform 100. For example, storage 116 may be accessed by platform 100 over a network 110 via the network interface controller 114.

In various embodiments, memory 118 may be volatile storage to provide active content for operation of components on platform 100. In various embodiments, memory 118 may include RAM, system management RAM (SMRAM), dynamic RAM (DRAM), static RAM (SRAM), synchronous DRAM (SDRAM), dual-data rate RAM (DDRRAM), cache, etc.

As described above, embodiments of the invention allow one OS (e.g., first OS 102 from FIG. 1) to be suspended into S3, saving its state to memory and turning off its devices. Then, another sleeping OS (e.g., second OS 104 from FIG. 1) can be resumed from another location in memory by switching a memory base addressed to a sequestered memory region and restoring its device state. A benefit of embodiments of the invention allow a user to quickly suspend one OS to the sleep mode or state and switch to another OS, picking up where the user left off with the switched OS, and all without having to reboot the system or platform (e.g., platform 100 from FIG. 1).

It is important to note that embodiments of the invention are not limited to two OSes, as illustrated in FIG. 1. Embodiments may be extended to any number of OS images that can fit in memory. The embodiment in FIG. 1 using two OSes as an illustrative example of having more than one OS image present in memory at a time.

Figure 2:
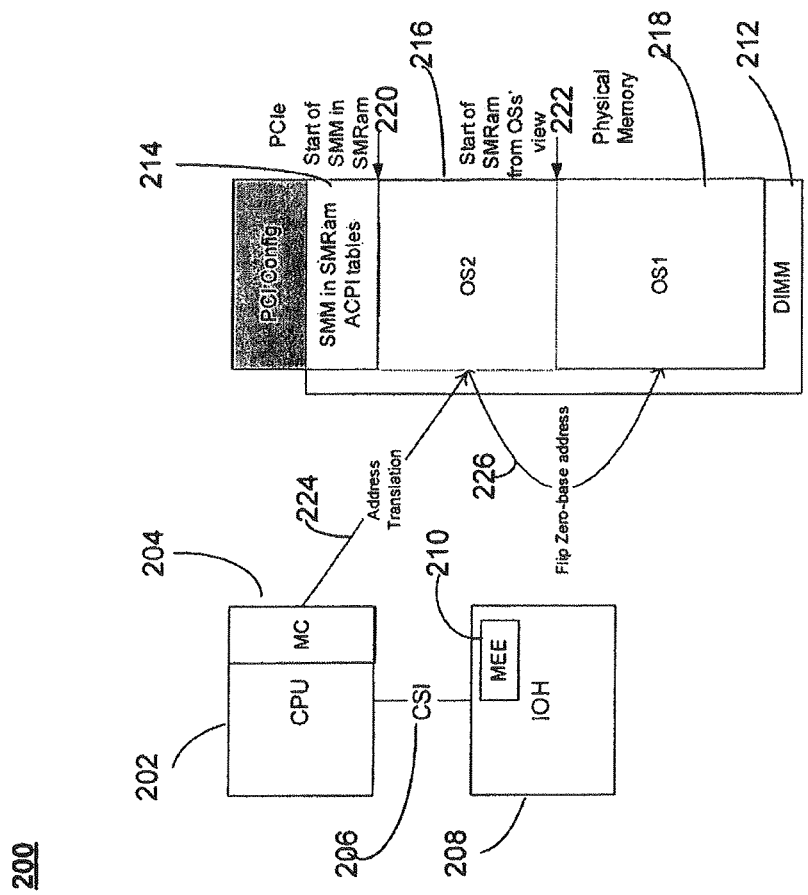
FIG. 2 illustrates an architectural overview, in accordance with an embodiment of the present invention.

FIG. 2 illustrates an architectural overview 200, in accordance with an embodiment of the present invention. Referring to FIG. 2, a central processing unit (CPU) 202 may include a memory controller (MC) 204. CPU 202 is connected via a CSI 206 to In/Out hub (IOH) 208. IOH 208 may include a manageability engine (MEE) 210. In embodiments, MEE 210 is a microcontroller in chipsets that are a part of Intel vPro platforms/Intel Active Management Technology (AMT).

FIG. 2 also illustrates a peripheral component interconnect (PCI) configuration that includes a dynamic random access memory module (DIMM) 212 (physical memory or dynamic RAM (DRAM)). DIMM 212 may include a region of physical memory 214 that represents a system management mode (SMM) in system management RAM (SMRAM) that stores advanced configuration and power interface (ACPI) tables. DIMM 212 may also include a region of physical memory 216 that stores data related to a second OS (OS2) and a region of physical memory 218 that stores data related to a first OS (OS1). Arrow 220 represents the start of SMM in SMRAM. Arrow 222 represents the start of SMRAM from the view of the OS. In embodiments, CPU 202 and memory controller 204 reset the base address of one memory region to replace it with another, as illustrated by arrows 224 and 226.

In embodiments, the SMRAM boundary protects the sleeping OS from DMA accesses, though memory controller 204 will need to assure that devices see the current active physical memory mapping (e.g., via VT-D remapping, for example) in sync with the associated OS's view of physical memory. In embodiments, this can be implemented by memory controller 204 flipping physical memory addresses within a range prior to accessing DRAM or via extended page table (EPT) mappings that can re-base physical memory for each OS RAM image. Switching can be very fast because the OS image is not copied from disk or even copied from one memory region to another. Here, only a simple address translation is required. Sleep switch latency is dictated by the OS's sleep logic and time required to suspend active hardware devices, which is typically on the order of a few seconds on existing hardware. While the two OSes do not run simultaneously, all states are saved and restored allowing the user to pick up right from where he or she left off. This is accomplished without having to reboot the system, without the use of virtualization software, incurs no additional costs and does not violate end user license agreements. Embodiments of the operation of the architecture illustrated in FIG. 2 will be described in detail below with reference to FIGS. 5-8.

In various embodiments, system 100 (FIG. 1) and/or architecture 200 (FIG. 2) may be implemented as a wireless system, a wired system, or a combination thereof. When implemented as a wireless system, system 100 and/or architecture 200 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 100 and/or architecture 200 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Figure 3:
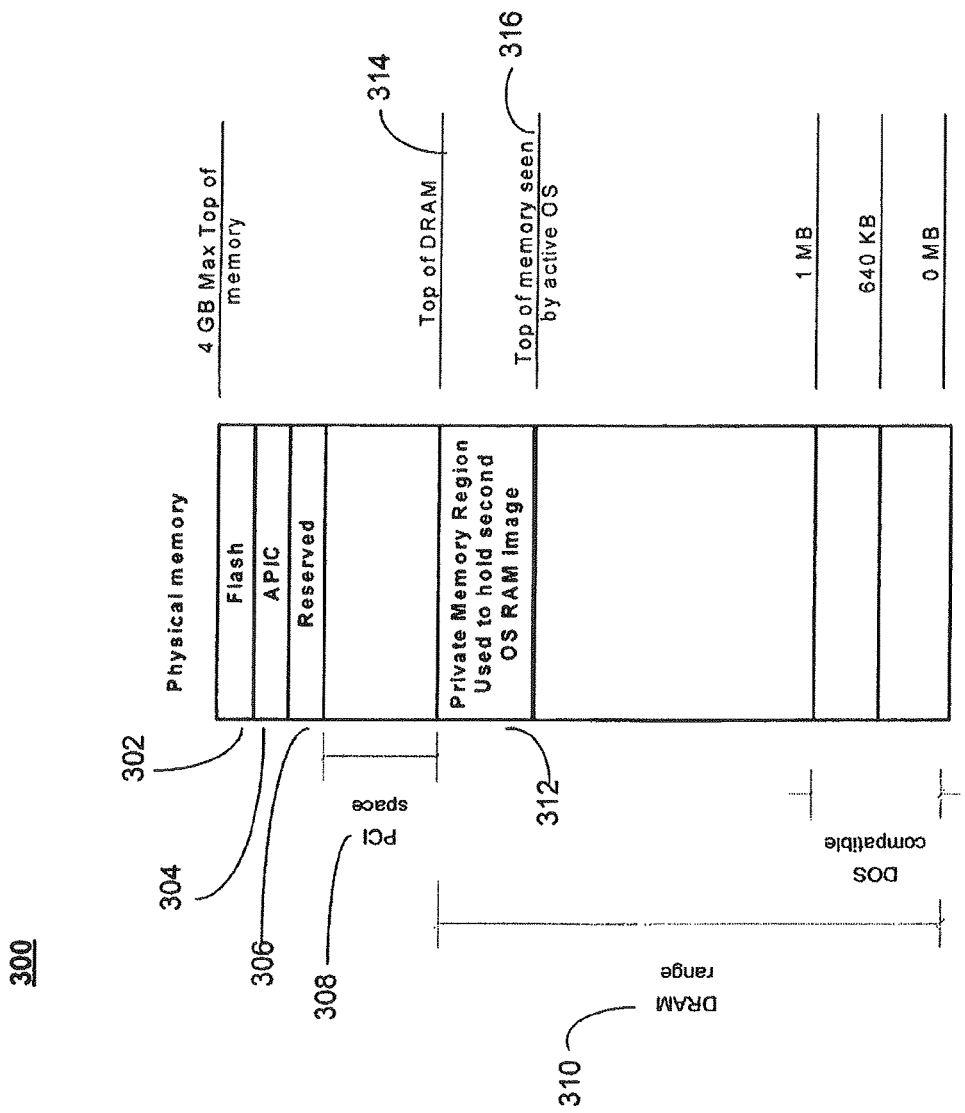
FIG. 3 illustrates a configuration of re-baseable memory, in accordance with an embodiment of the present invention.

FIG. 3 illustrates a configuration of re-baseable memory 300, in accordance with an embodiment of the present invention. As shown in FIG. 3, re-baseable memory 300 may include various memory regions for storing data related to flash data 302, APIC data 304, reserved data 306, PCI space data 308 and DRAM range data 310. As illustrated in FIG. 3, DRAM range 310 may include a private memory region 312 that is used to hold the second OS RAM image. Line 314 represents the top of DRAM, while line 316 represents the top of memory seen by the active OS. This is further described with reference to FIG. 4.

Figure 4:
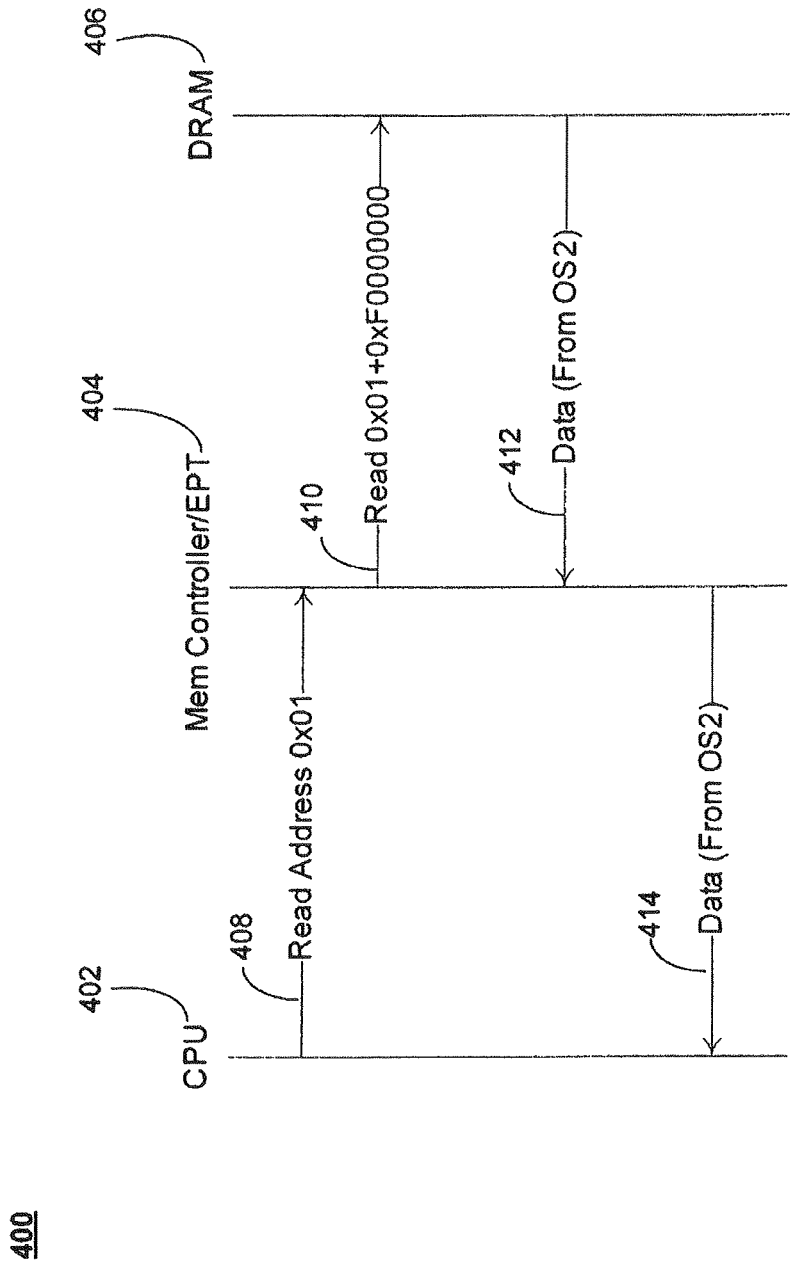
FIG. 4 illustrates a translation of physical memory address read to redirect to upper memory region occupied by a second OS RAM image, in accordance with an embodiment of the present invention.

FIG. 4 shows a diagram 400 that illustrates a translation of physical memory address read to redirect to upper memory region occupied by a second OS RAM image, in accordance with an embodiment of the present invention. As described above and in embodiments, a CPU 402 and a memory controller/EPT 404 reset the base address of one memory region in DRAM 406 to replace it with another, as illustrated by arrows 408, 410, 412 and 414. In embodiments, once the first OS is suspended and BIOS SMM is in control, physical memory is rebased using new hardware or extended page tables (EPT) such that the upper region of DRAM within the SMRAM range is now at base 0 address.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof.

Figure 5:
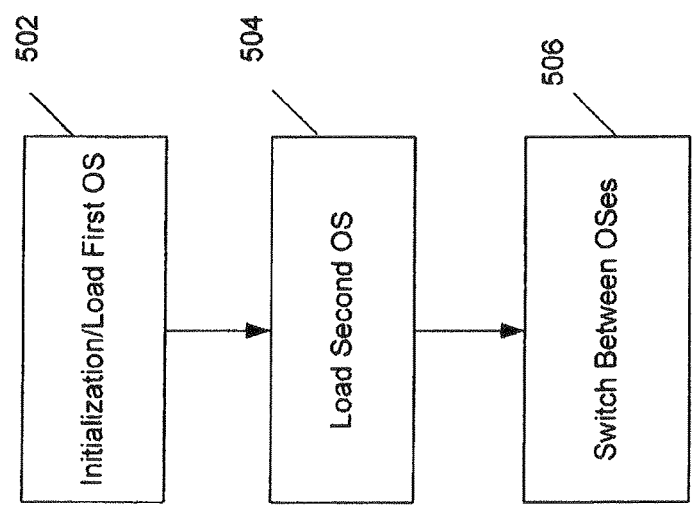
FIGS. 5-8 illustrate flow diagrams, in accordance with an embodiment of the present invention.

FIG. 5 illustrates a flow diagram 500, in accordance with an embodiment of the present invention. Referring to FIG. 5, a first OS is initialized and loaded at 502, a second OS is loaded at 504 and the user is able to switch between the first and second OS at 506. Each of these steps is described in more detail in the flow diagrams of FIGS. 6-8, respectively.

As noted above, it is important to note that embodiments of the invention are not limited to two OSes, as illustrated in FIG. 5. Embodiments may be extended to any number of OS images that can fit in memory. The embodiment in FIG. 5 using two OSes as an illustrative example of having more than one OS image present in memory at a time. For example, if memory is able to support four OS images, then the user may switch between the four OS images in memory. This example is not meant to limit the invention.

Figure 6:
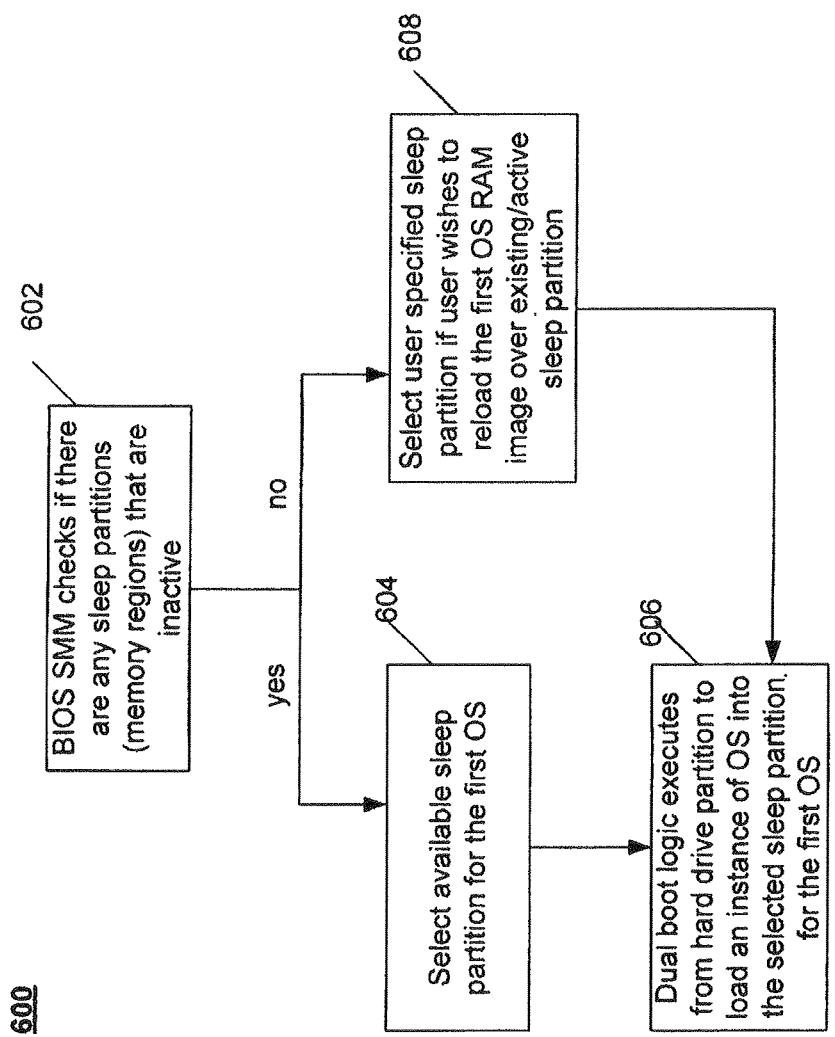

FIG. 6 illustrates a logic flow 600 that further describes the task of initializing and loading the first OS (502 from FIG. 5), according to an embodiment. In embodiments, a dual boot configuration allows multiple OS images to share the hard drive. Referring to FIG. 6, on initial startup, BIOS system management module (SMM) checks if there are any sleep partitions (memory regions) that are inactive, at 602. If so, then at 604 an available sleep partition is selected for the first OS. If not, then a user specified sleep partition may be selected if the user wishes to reload the first OS RAM image over an existing/active sleep partition at 608. Dual boot logic executes from the hard drive partition to load an instance of the OS into the selected sleep partition for the first OS at 606.

Figure 7:
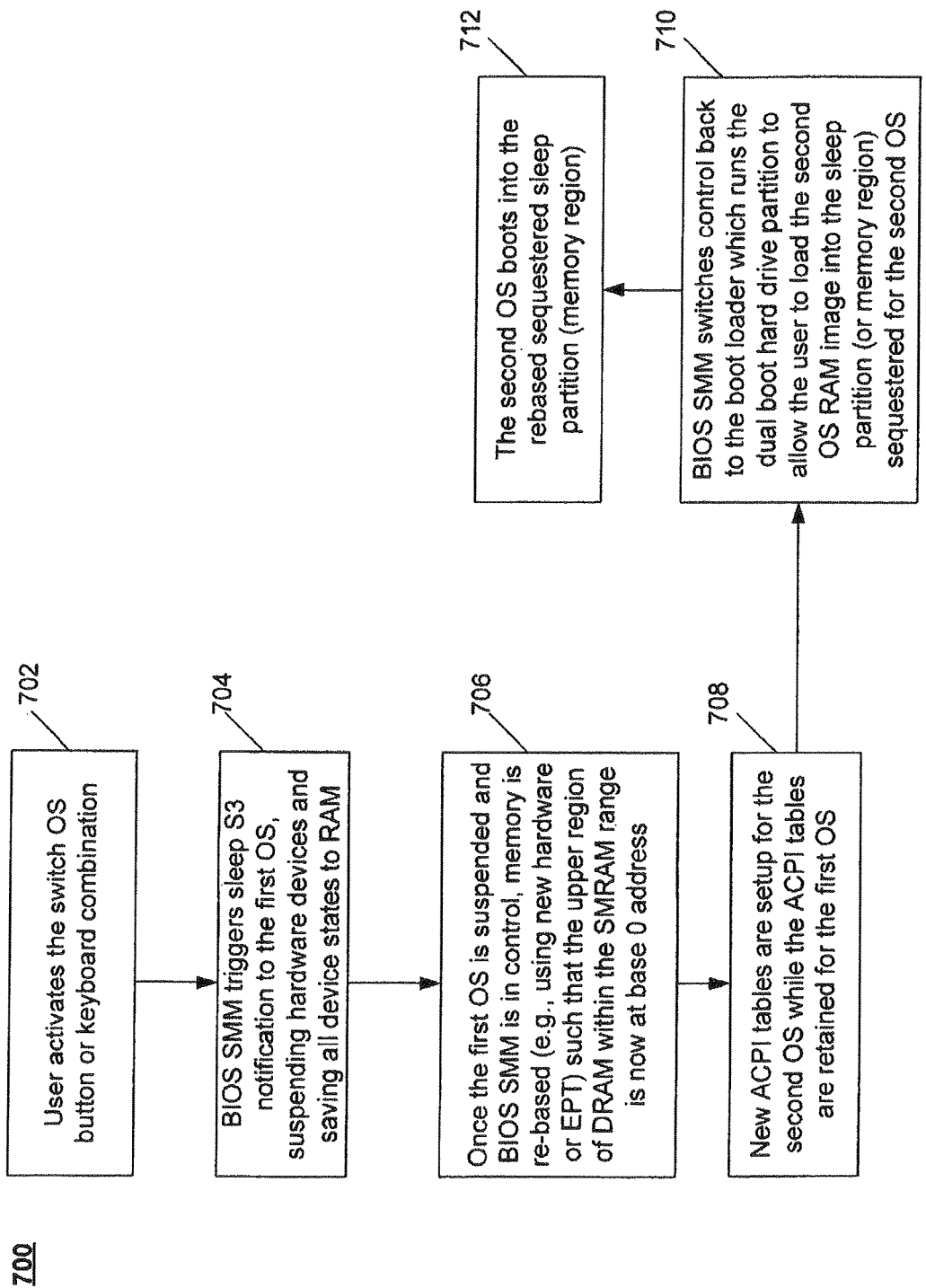

FIG. 7 illustrates a logic flow 700 that further describes the task of loading a second OS (504 from FIG. 5), according to an embodiment. Referring to FIG. 7, a user activates a switch OS button or presses a predetermined keyboard combination, for example, at 702. BIOS SMM triggers a sleep S3 notification to the first OS (running OS) at 704. Here, the hardware devices of the first OS are suspended and all device states are saved to RAM. In embodiments, the ACPI prepare to sleep (PTS) and going to sleep (GTS) methods are poked.

At 706, once the first OS is suspended and BIOS SMM is in control, physical memory is re-based using new hardware or extended page tables (EPT) such that the upper region of DRAM within the SMRAM range is now at base 0 address. In embodiments, EPT provides a general way to remap physical memory underneath an OS. Other embodiments include use of a specific memory range register configurable by SMM to remap, or swap memory addresses between the multiple OSes stored in memory.

At 708, new Advanced Configuration and Power Interface (ACPI) tables are set up for the second OS while the ACPI tables are retained for the first OS. At 710, BIOS SMM switches control back to the boot loader which runs the dual boot hard drive partition to allow the user to load the second OS RAM image into the sleep partition (or memory region) sequestered for the second OS. At 712, the second OS boots into the rebased sequestered sleep partition.

Figure 8:
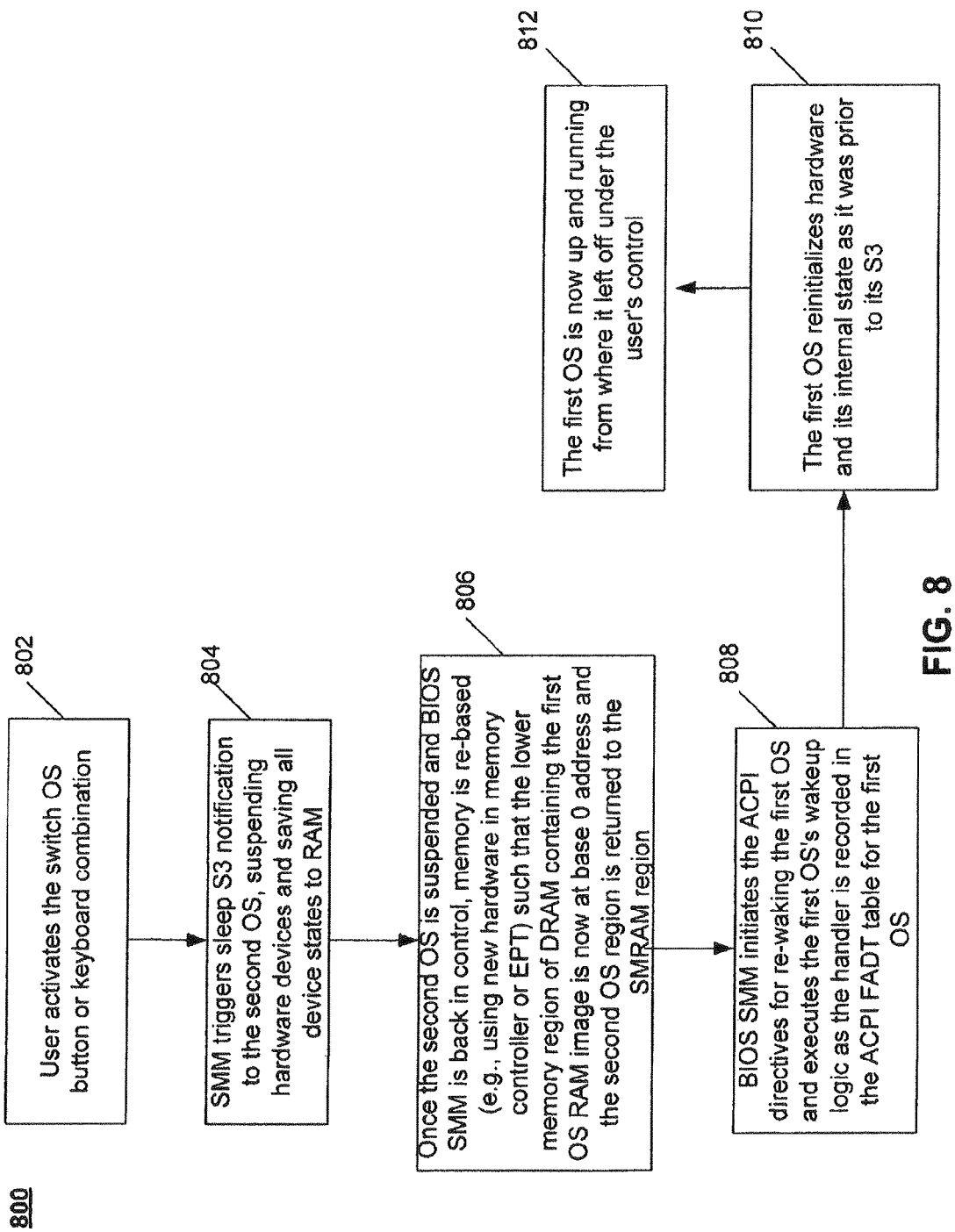

FIG. 8 illustrates a logic flow 800 that further describes the task of enabling the user to switch between the first and second OS (506 from FIG. 5), according to an embodiment. Referring to FIG. 8, a user activates a switch OS button or presses a predetermined keyboard combination, for example, at 802. The SMM triggers a sleep S3 notification to the second OS at 804. Here, the hardware devices of the second OS are suspended and all device states are saved to RAM.

At 806, once the second OS is suspended and BIOS SMM is back in control, memory is re-based (e.g., using new hardware in memory controller or EPT) such that the lower memory region of DRAM containing the first OS RAM image is now at base 0 address and the second OS region is returned to the SMRAM region. At 808, BIOS SMM initiates the ACPI directives for re-waking the first OS and executes the first OS's wakeup logic as the handler is recorded in the ACPI Fixed ACPI Description Table (FADT) for the first OS.

At 810, the first OS reinitializes hardware and its internal state as it was prior to its S3 or sleep state. At 812, the first OS is now up and running from where it left off under the user's control.

As described above, SMRAM boundary protects the sleeping OS from DMA accesses, though the memory controller will need to assure that devices see the current active physical memory mapping (e.g., via VT-D remapping, for example) in sync with the associated OS's view of physical memory. In embodiments, this can be implemented by the memory controller flipping physical memory addresses within a range prior to accessing DRAM or via extended page table (EPT) mappings that can rebase physical memory for each OS RAM image. Switching may be very fast because the OS image is not copied from disk or even copied from one memory region to another. Here, only a simple address translation is required. Sleep switch latency is dictated by the OS's sleep logic and time required to suspend active hardware devices, which is typically on the order of a few seconds on existing hardware. While the two OSes do not run simultaneously, all states are saved and restored allowing the user to pick up right from where he or she left off. This is accomplished without having to reboot the system, without the use of virtualization software, incurs no additional costs and does not violate end user license agreements.

Embodiments provide for faster switching between the first and second OS in sleep mode to give the illusion to the user of the two OSes running simultaneously. Here, for example, intelligent device drivers may be used to minimize the suspend/resume time and thus provide for faster switching between the two OSes. Another example of providing for faster switching between the two OSes involves disabling certain devices (e.g., graphics devices) such that one of the OSes does not have to re-initialize that device state on resume and thus leaving the device active for the primary OS. Network drivers, on the other hand, would need to track the current active OS and associate packet header information with the relevant OS and queue interrupts for that OS when it reawakens. An advantage of this technique over virtualization is that the OS is aware of the sleep state, and thus restrictions on the amount of time an OS can be stalled by another entity (such as SMM, which is required to run within less than 500 ms by some operating systems) is not an issue.

As used herein, the term "component" is intended to refer to programming logic and associated data that may be employed to obtain a desired outcome. The term component may be synonymous with "module" or "agent" and may refer to programming logic that may be embodied in hardware or firmware, or in a collection of software instructions, possibly having entry and exit points, written in a programming language, such as, for example, C++, Intel Architecture 32 bit (IA-32) executable code, etc.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or rewriteable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
   loading a first operating system (OS) into a first memory region of physical memory of a platform; and
   loading a second OS into a second memory region of the physical memory after suspending the first OS into a sleep mode and when a BIOS system management module (SMM) is in control.

2. The method of claim 1, wherein loading the second OS into the second memory region comprises:
   suspending one or more hardware devices being used by the first OS;
   saving a state of each of the one or more hardware devices;
   re-basing the physical memory such that an upper region of dynamic random access memory (DRAM) within a system management random access memory (SMRAM) range is at base 0 address;
   setting up one or more ACPI tables for the second OS;
   retaining one or more ACPI tables for the first OS; and
   loading an OS RAM image of the second OS into the second memory region.

3. The method of claim 1, further comprising switching back to the first OS without rebooting the platform while suspending the second OS into a sleep mode.

4. The method of claim 3, wherein switching back to the first OS comprises re-basing the physical memory such that a lower region of dynamic random access memory (DRAM) within a system management random access memory (SMRAM) range is at base 0 address.

5. The method of claim 3, wherein the switching between the first and second OSs is activated via a user.

6. The method of claim 1 comprising re-basing the physical memory such that a lower region of dynamic random access memory (DRAM) within a system management random access memory (SMRAM) range is at base 0 address.

7. A system comprising:
   a physical memory module configured to include a sequestered memory region; and
   a memory controller configured to re-base the sequestered memory region to allow a first operating system (OS) to be suspended into a sleep mode and to allow a second OS to be active;
   wherein the memory controller is configured to re-base the sequestered memory region (a) while both of the first and second OSs are suspended, and (b) when a BIOS system management module (SMM) is in control.

8. The system of claim 7, wherein a system management random access memory (SMRAM) boundary protects the second OS from direct memory accesses.

9. The system of claim 7, wherein the memory controller is configured to switch back to the first OS, which comprises:
   suspending one or more hardware devices being used by the second OS;
   saving a state of each of the one or more hardware devices;
   re-basing the physical memory such that a lower region of dynamic random access memory (DRAM) within a system management random access memory (SMRAM) range is at base 0 address; and
   reinitializing one or more hardware device states of the first OS.

10. The system of claim 9, wherein the switching between the first and second OSs is activated via a user.

11. The system of claim 7 comprising re-basing the physical memory such that a lower region of dynamic random access memory (DRAM) within a system management random access memory (SMRAM) range is at base 0 address.

12. A computer-readable non-transitory storage medium containing instructions which, when executed by a processing system, cause the processing system to perform instructions for:
- loading a first operating system (OS) into a first memory region of physical memory of a platform; and
- loading a second OS into a second memory region of the physical memory after suspending the first OS into a sleep mode;
- wherein a system management random access memory (SMRAM) boundary protects the second OS from direct memory accesses.

13. The computer-readable non-transitory storage medium of claim 12, wherein loading the second OS into the second memory region comprises:
- suspending one or more hardware devices being used by the first OS;
- saving a state of each of the one or more hardware devices;
- re-basing the physical memory such that an upper region of dynamic random access memory (DRAM) within a system management random access memory (SMRAM) range is at base 0 address;
- setting up one or more ACPI tables for the second OS;
- retaining one or more ACPI tables for the first OS; and
- loading an OS RAM image of the second OS into the second memory region.

14. The computer-readable non-transitory storage medium of claim 13 comprising re-basing the physical memory such that a lower region of dynamic random access memory (DRAM) within a system management random access memory (SMRAM) range is at base 0 address.

15. The computer-readable non-transitory storage medium of claim 12 comprising switching back to the first OS without rebooting the platform while suspending the second OS into a sleep mode.

16. The computer-readable non-transitory storage medium of claim 15, wherein switching back to the first OS comprises:
- suspending one or more hardware devices being used by the second OS;
- saving a state of each of the one or more hardware devices;
- re-basing the physical memory such that a lower region of dynamic random access memory (DRAM) within a system management random access memory (SMRAM) range is at base 0 address; and
- reinitializing one or more hardware device states of the first OS.

17. The computer-readable non-transitory storage medium of claim 15, wherein switching back to the first OS comprises re-basing the physical memory such that a lower region of dynamic random access memory (DRAM) within a system management random access memory (SMRAM) range is at base 0 address.

* * * * *